(12) United States Patent
Stark et al.

(10) Patent No.: US 10,394,667 B2
(45) Date of Patent: Aug. 27, 2019

(54) SYSTEM AND METHODS FOR BACKING UP AND RESTORING DATABASE OBJECTS

(71) Applicant: HYLAND SWITZERLAND SÀRL, Geneva (CH)

(72) Inventors: Charlie Arnold Stark, Burnsville, MN (US); David Pierre Gendron, Coon Rapids, MN (US); Jeffrey Allen Romatoski, Woodbury, MN (US); Larry Robert Sitka, Stillwater, MN (US); Razvan Atanasiu, Victoria, MN (US)

(73) Assignee: HYLAND SWITZERLAND SÀRL, Geneva (CH)

( * ) Notice: Subject to any disclaimer, the term of this patent is extended or adjusted under 35 U.S.C. 154(b) by 363 days.

(21) Appl. No.: 15/053,875

(22) Filed: Feb. 25, 2016

(65) Prior Publication Data

US 2016/0246687 A1    Aug. 25, 2016

Related U.S. Application Data

(60) Provisional application No. 62/120,698, filed on Feb. 25, 2015.

(51) Int. Cl.
*G06F 17/30* (2006.01)
*G06F 11/14* (2006.01)
*G06F 16/11* (2019.01)

(52) U.S. Cl.
CPC ...... *G06F 11/1469* (2013.01); *G06F 11/1435* (2013.01); *G06F 16/11* (2019.01); *G06F 2201/80* (2013.01); *G06F 2201/835* (2013.01)

(58) Field of Classification Search
CPC .................................................. G06F 11/1469
See application file for complete search history.

(56) References Cited

U.S. PATENT DOCUMENTS

2014/0379640 A1* 12/2014 Romatoski ........ G06F 17/30575
707/610

* cited by examiner

*Primary Examiner* — Syed H Hasan
(74) *Attorney, Agent, or Firm* — Medley, Behrens & Lewis, LLC

(57) ABSTRACT

A system and methods for backing up and restoring updates to metadata of files stored in a database are disclosed. One example embodiment of the method includes entering the updates to the metadata of the one or more files into a first database table; generating a backup file of the first database table; and restoring the updates to the metadata to the one or more files using the backup file. Restoring the updates may include creating a recovery table populated with data from the backup file; determining the one or more files to apply the updates to by searching the recovery table for an identifier of the one or more files; and adding the updates to the metadata from the recovery table to the corresponding one or more files that matches the identifier identified from the recovery table.

20 Claims, 2 Drawing Sheets

SYSTEM AND METHODS FOR BACKING UP AND RESTORING DATABASE OBJECTS

CROSS REFERENCES TO RELATED APPLICATIONS

The present application is related to and claims priority under 35 U.S.C. 119(e) from U.S. provisional application No. 62/120,698, filed Feb. 25, 2015 entitled, "System and Methods of Backing Up and Restoring Database Objects," the content of which is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present invention relates generally to a system and methods of restoring metadata to an image file using an associated database table.

2. Description of the Related Art

Typically, when updates to a DICOM object such as a DICOM image file are received, the new data are written to a patch area of each image file. The patch area is a separate area in the image file where any changes such as changes made through merges and the like are stored. This method of updating may be done either immediately after receiving the new information or via delayed image updates. When managing hundreds, or even thousands of DICOM objects, writing updates on each image file may become a long and arduous task.

Recovering lost or destroyed DICOM objects also typically includes retrieving image files that are stored on disk as backup, re-storing the disk-resident image files to replace the lost or destroyed image files, and repopulating the database with the new images. This mechanism for restoring the DICOM objects may generate a new set of GUIDs which are used for locating the Patient, Study, Series and Image data of the DICOM objects.

Accordingly, there is a need for a faster and more efficient method of updating existing DICOM objects and recovering lost or destroyed DICOM objects. There is a need in the art for a method that allows for restoration of DICOM objects seamlessly and with less performance issues than the existing mechanisms.

SUMMARY

In the present disclosure, a system and method for backing up updates to metadata and restoring the image files with the updated metadata are disclosed. One example method for backing up and restoring one or more updates into metadata of one or more files stored in a database may include entering the one or more updates to the metadata of the one or more files to a first database table; generating a backup file of the first database table; and restoring the one or more updates to the metadata by: creating a recovery table populated with data from the backup file; determining which of the one or more files to apply the one or more updates to by searching one or more entries in the recovery table for an identifier of the one or more files; and adding the one or more updates to the metadata from the recovery table to the corresponding one or more files that matches the identifier identified from the recovery table.

From the foregoing disclosure and the following detailed description of various example embodiments, it will be apparent to those skilled in the art that the present disclosure provides a significant advance in the art of methods for enabling network-based processes in a device during a network downtime condition. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
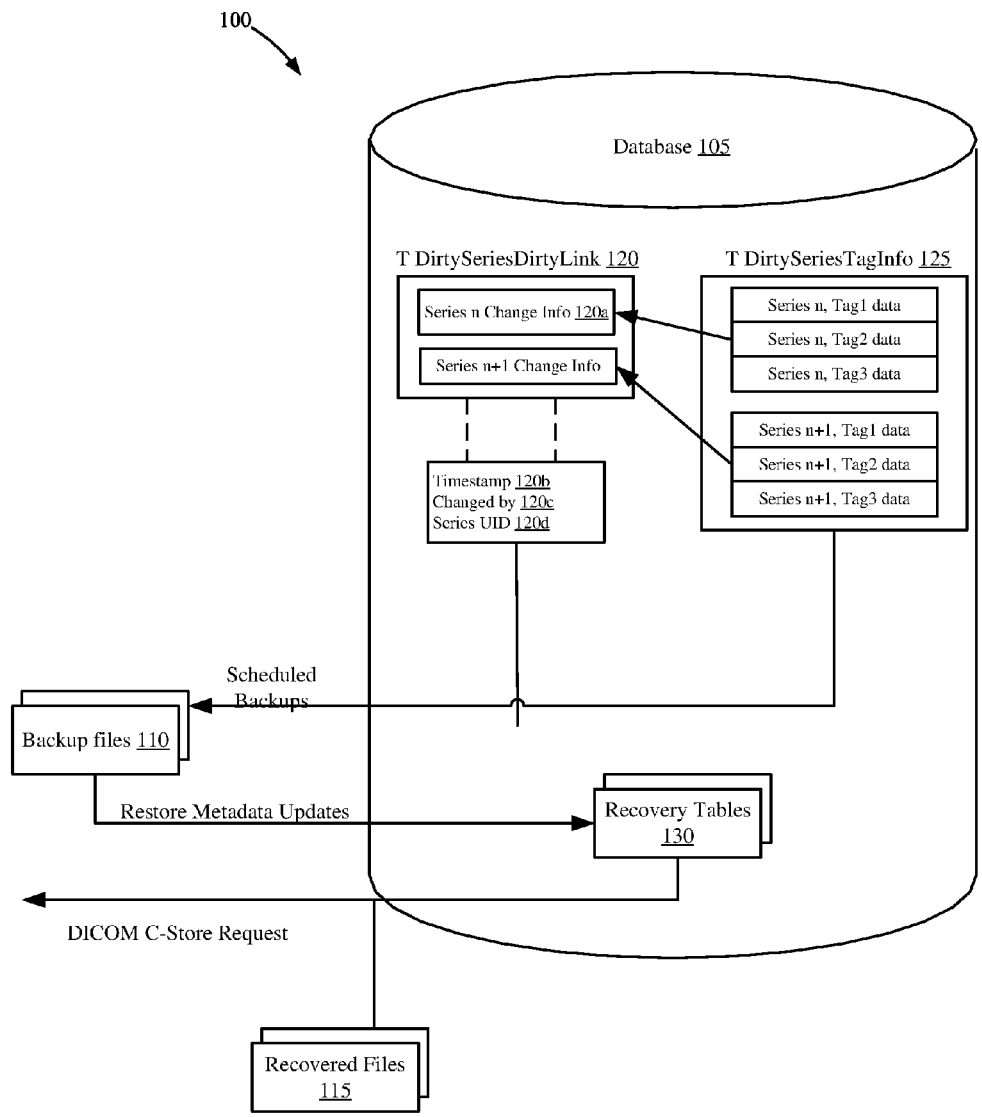
FIG. 1 shows a system for backing up and recovering metadata updates to one or more files, the system including a database, disk-resident backup files and files corresponding to the entries in the database.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are methods and a system for restoring database entries corresponding to content such as, for example, DICOM content, where the restoring is performed using files on disk. In one example embodiment, the method includes entering changes or updates made on the DICOM content metadata to a database table containing entries associated with the DICOM content, saving the database table to one or more files on disk, and using the saved one or more files to restore the updates on the database. The backing up and restoring of metadata of the DICOM content may further include entering updates to the metadata to a first database table, the updates associated with the DICOM content stored in the database; generating a backup file of the first database table; saving the backup file in a non-transitory computer readable storage medium; retrieving the metadata updates by creating a recovery table populated with information from the backup file stored in the medium; incorporating the metadata updates to the DICOM content by: searching for one or more entries in the recovery table matching an identifier of the DICOM content; and adding the metadata updates matching the identifier of the DICOM content from the recovery table to the corresponding patch area of the DICOM content.

For purposes of the present disclosure, it will be appreciated that content may refer to files such as, for example, documents, image files, audio files, among others. Content may also refer to paper-based records converted into digital files to be used by a computing device. Content may also refer to information that provides value for an end-user or content consumer in one or more specific contexts. Content may be shared via one or more media such as, for example, computing devices in a network.

In an example embodiment, content may refer to computerized medical records, or electronic medical records (EMRs), created in a health organization, or any organization that delivers patient care such as, for example, a physician's office, a hospital, or ambulatory environments. EMRs may include orders for drug prescriptions, orders for tests, patient admission information, imaging test results, laboratory results, and clinical progress information, among others.

Content may also refer to an electronic health record (EHR) which may be a digital content capable of being distributed, accessed or managed across various health care settings. EHRs may include various types of information such as, for example, medical history, demographics, immunization status, radiology images, medical allergies, personal states (e.g., age, weight, etc.), vital signs and billing information, among others. EHR and EMR may also be referred to as an electronic patient record (EPR). The terms EHR, EPR, EMR, document, content and object may be used interchangeably for illustrative purposes throughout the present disclosure.

In another example embodiment, content may also refer to Digital Imaging and Communications in Medicine (DICOM) images. DICOM is a standard or specification for transmitting, storing, printing and handling information in medical imaging. Medical imaging, as will be known in the art, may refer to a process and/or technique used to generate images of the human body, or parts or functions thereof, for medical and/or clinical purposes such as, for example, to diagnose, reveal or examine a disease. The standard set by DICOM may facilitate interoperability of various medical imaging equipment across a domain of health enterprises by specifying and/or defining data structures, workflow, data dictionary, compression and workflow, among other things, for use in generating, transmitting and accessing the images and related information stored on the images. DICOM content may refer to medical images following the file format definition and network transmission protocol as defined by DICOM. DICOM content may include a range of biological imaging results and may include images generated through radiology and other radiological sciences, nuclear medicine, thermography, microscopy and medical photography, among many others. DICOM content may be referred to hereinafter as images following the DICOM standard, and non-DICOM content for other forms and types of content, as will be known in the art.

In one example embodiment, the content files are in DICOM format and the updates received may be changes to the metadata of the DICOM content files in at least one of the DICOM hierarchal levels: Patient, Study and Series. In a typical DICOM model, a patient such as, for example, a John Smith, may have one or more studies which may also be referred to as medical exams and/or procedures. Each study may include one or more series. A series may refer to a specific modality or type of data, or a position of the patient on the modality and/or acquisition device that was used for the study. Each series may contain one or more DICOM object instances which are usually images but may also be waveform objects, or medical reports, among others. These metadata are included in each DICOM object of a study such that when a study is performed on a patient, the study containing two series each with ten instances, each header for all the instances will include the patient and study metadata. The instances will also contain information about the series where it belongs and its instance information.

Content may be generated and maintained within an institution such as, for example, an integrated delivery network, hospital, physician's office or clinic, to provide patients, health care providers, insurers and/or payers access to records of a patient across a number of facilities. Sharing of content may be performed using network-connected enterprise-wide information systems, and other similar information exchanges or networks, as will be known in the art.

FIG. 1 shows an example system 100 that includes a database 105, backup files 110 and recovered files 115. Database 105 may be a DICOM database that stores one or more database tables corresponding to content generated from content sources (not shown).

Database 105 may include database objects such as database tables that may be used to store and/or reference content. In one example embodiment, database 105 may be stored on a database server that is used to connect a client computer to the one or more databases used by content sources to store and/or reference content generated by the content sources.

Backup files 110 may be files stored in a computer-readable storage medium communicatively connected with database 105, and may contain data from database 105 that may be used to restore database objects and metadata changes to the database objects. Backup files 110 may be generated through exporting data from a server table into one or more data files and storing the data files into a disk. In this example embodiment, backup files 110 may be generated using the database tables 120 and 125 during backups at a predefined date and time such as, for example, daily backups.

Database 105 may include a first database table 120 such as, for example, a TDirtySeriesDirtyLink, associated with a second table 125 such as, for example, the TDirtySeriesTagInfo. For illustrative purposes, the tables are named "Dirty" to refer to data that has not yet been committed to a common storage such as, for example, database 105. Since the image files are not updated when metadata changes are made, the data in these tables are considered 'dirty'.

When database 105 receives a change to a metadata of a content file, the changes are saved in example TDirtySeriesDirtyLink table 120 and TDirtySeriesTagInfo table 125. TDirtySeriesLink table 120 may store information about the updates or change 120a such as, for example, a timestamp 120b of the change, an identifier of the user 120c or entity who made the change and an identifier of the series 120d of the DICOM file affected by the change in the metadata. TDirtySeriesTagInfo 125 may include an identifier (i.e., tag) of the metadata item that was changed and the new value for that item. An example of a metadata tag is an identifier PatientID that refers to the patient ID metadata of a DICOM image file. Other examples of metadata tags include PatientBirthDate, ImageActualDate, MRImagingModifierSequence, among many others. There may be a 1-to-n relationship between the TDirtySeriesLink table and the TDirtySeriesTagTable.

System 100 may also include recovered files 115 which may be files containing restored metadata or the most recent metadata of the content files. Recovered files 115 may be generated using recovery tables 130, and patching of the files may be performed prior to a DICOM C-store request which sends the now-recovered image data files to a server application to be used by client devices. The one or more recovery tables 130 in database 105 may be used to recover one or more tables in database 105. Recovery tables 130 may be database tables that are generated using backup files 110, as will be discussed in greater detail below.

Database 105 may be associated with one or more records or DICOM content files such as image records generated by the content sources. Database 105 may also include other tables such as T_Patient, T_Study, and T_Series tables (not shown) to manage the image files in the different DICOM hierarchal levels such as the patient, study and series levels, respectively. Content sources from which the DICOM content files may be received refer to producers of content that utilize a computing device to create and submit content having associated metadata for storage in database 105. In an example embodiment, the content sources may be computing devices used to generate the content such as imaging content sources that generate imaging assets (e.g., medical images) that may be made available to one or more users of system 100. For example, imaging content sources may be medical imaging equipment such as MRI, X-Ray, ultrasound machines, mammography, CT scan and many other apparatuses. In another example embodiment, the content sources may be a computing device used by organizations that deliver care such as, for example, a physician's office or a hospital.

Figure 2:
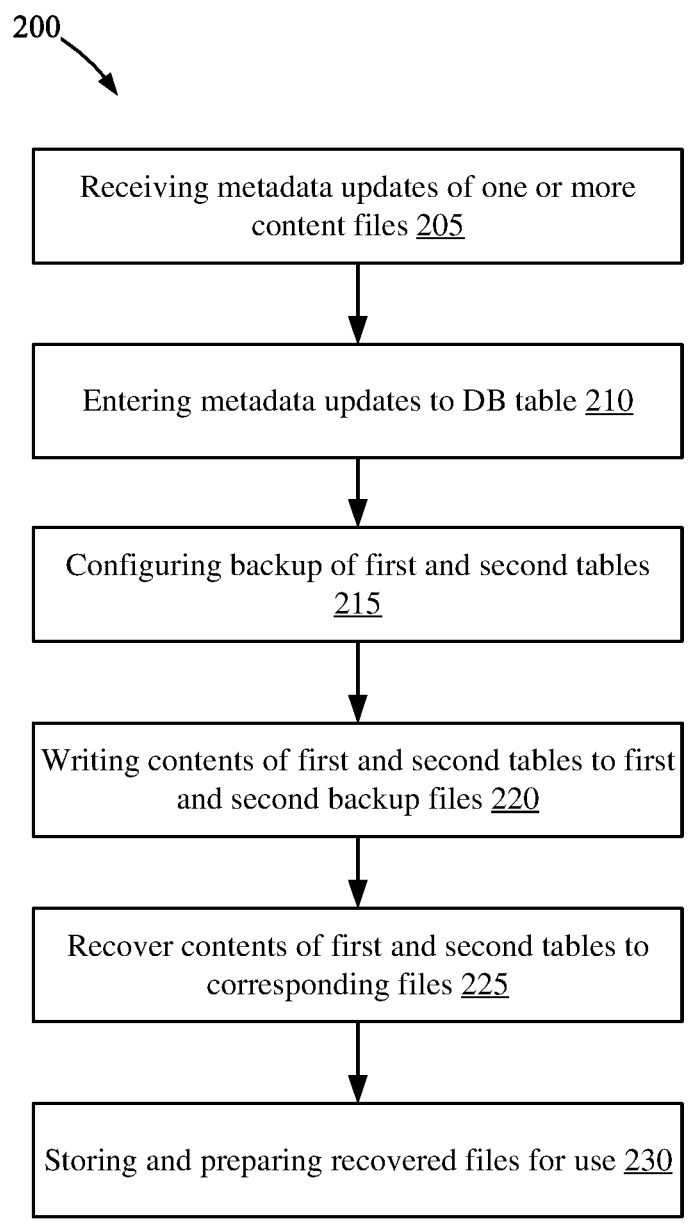
FIG. 2 shows an example method for backing up and recovering files in conjunction with the system of FIG. 1.

FIG. 2 shows an example method 200 of backing up content metadata to disk-resident backup files. The disk-resident backup files may then be used to restore the content metadata to the image files for sending from a client application to a server application to be used by end-users. For illustrative purposes, the content metadata may be metadata of DICOM image files.

At block 205, updates to metadata of one or more image files may be received from one or more content sources. Updates may be made in at least one of the patient, study and series level of the image files. Examples of the updates may include name and birthdate for changes in the patient metadata; age, sex, and weight for changes in the study metadata; and modality, body part and performing physician for changes in the series metadata.

At block 210, the updates to the metadata are entered into a database table such as, for example, a Dirty Series table of database 105 with which the image files are associated. In this example embodiment, updates to the image files are no longer saved in disk-resident files when they are received and are instead organized in the Dirty Series database table.

Information about the receiving of the updates to the metadata may be entered into the database table such as, for example, a timestamp of the metadata updates, an identifier of the source of the metadata updates, an identifier of the image files that are affected by the updates to the metadata, and other related information as will be known in the art.

In one example embodiment, the updates to the metadata are entered into a pair of tables, TDirtySeriesLink table 120 and TDirtySeriesTagInfo table 125. TDirtySeriesLink database table 120 may store information about the updates or change 120a such as, for example, a timestamp 120b of the change, an identifier of the user or entity 120c who made the change and/or an identifier of the series 120d of the DICOM file affected by the change in the metadata. TDirtySeriesTagInfo table 125 may include an identifier (i.e., tag) of the metadata item that was changed and the new value for that item.

At block 215, one or more backup files 110 of the Dirty Series table may be created at a predefined date and time. The at least one backup file is a copy of the contents of the Dirty Series table saved at another location that preserves the contents of the table to prevent data loss. Creating a backup of the table that contains the updates includes selecting a folder from a computer-readable storage medium where the backup files will be stored. The number of backup files to be generated and stored and the frequency with which backup files are created may be selected by a user.

In an alternative example embodiment, at least two backup files of the Dirty Series table may be created: one backup file that contains the entries of TDirtySeriesLink table 120 at the time the backup file was created, and a second backup file that contains the entries of TDirtySeriesTagInfo table 125 at the time the second backup file was created.

At block 220, at the configured/scheduled date and time, the Dirty Series Table contents may be written to a pair of files such as, for example, "DBNAME_SeriesDirtyLinks_Backup" and "DBNAME_SeriesDirtyTagInfo_Backup", to back up the contents of the T_DirtySeriesDirtyLink table 120 and TDirtySeriesTagInfo table 125, respectively. "DBNAME" is a placeholder that will be replaced by the actual database name of the database that is backed up by the files.

The example backup file "DBNAME_SeriesDirtyLinks_Backup" may include a copy of at least the following information: timestamp of the change, an identifier of the user or entity who made the change and an identifier of the series affected by the change in the metadata. The example backup file "DBNAME_SeriesDirtyTagInfo_Backup" may include an identifier (e.g., tag) of the metadata item that was changed and the new value for that item. For example, if the patient name was changed from "John Smith" to "John Schmidt", the identifier PatientName for the patient name metadata item will be included in the "DBNAME_SeriesDirtyTagInfo_Backup" along with the new value for the patient name "John Schmidt".

In one example embodiment, there may be one set or pair of files per database stored in the folder selected for that particular database. Each of the backup files may be generated using the SQL BCP (Bulk Copy Program) utility to export data out of the database tables into the corresponding backup data files. A number of backup files may be specified by the user such that the generated backup files are pruned such that only the configured number of backup files will be stored in the local folder.

At block 225, a recovery process may be initiated to restore the Dirty Series Table and associate the updated entries, as organized in the Dirty Series Table, with the corresponding image files. The Dirty Series Tag backup files may be used to recreate one or more recovery tables after existing mechanisms to recover full databases are performed. In an alternative example embodiment, the recovery tables may not be recreated but the entries corresponding to the updates to the content files may be incorporated into the data stream recovered using existing recovery processes.

In one example embodiment, the recovery process may be performed by a command line tool for restoring the Dirty Series tables. For illustrative purposes, the command tool may be RestoreMetadataUpdates File=fffff, where fffff equals the full path/filename of one of the files created by the backup procedure. The other filename of the other backup file (e.g., DBNAME_SeriesDirtyLinks_Backup) may be derived from the first. Since the filenames are prefaced with the example name of the database to be restored (e.g., "DICOMDB"), the database name may be easily extracted from the filename of the backup file, preventing any mismatch that could occur if it were required as a separate command line parameter.

The recovery may be accomplished by running a stored procedure to create recovery files in the DICOMDB database such as, new T_SeriesDirtyLinkRecovery and T_SeriesDirtyTagInfoRecovery. An export/import command tool may then be performed to populate these recovery tables from the back up files stored from the disk. One example command tool is SQL BCP. The BCP utility may be used to import large numbers of new rows into SQL server tables. The BCP utility may also be used to export data out of tables into data files and to bulk copy data between an instance of Microsoft SQL server and a data file in a user-specified format.

In one alternative example embodiment, the updated entries in the Dirty Series table may be periodically applied to the image files, wherein the recovery and/or updating of the image files are performed on a scheduled date and time.

Regardless of which example embodiment is taken to recover the content files and restore the most recent metadata to the content files, the desired end result is expected to be the same—the image history after the recovery will match the image history which existed before the recovery.

At block 230, the recovered image data files are then stored and readied for the DICOM C-store request which pushes the image data files from a client application to a server application to be used by client devices. The restoring of the images to the database 105 may be performed by searching for entries in the T_SeriesDirtyLinkRecovery and T_SeriesDirtyTagRecovery tables in the DICOMDB database that match with the Series UID of the image file. Results will be returned in ascending order and added to the patch area to preserve the order that the changes were originally made.

Applying the patches prior to sending the C-Store request and pushing the image data files from a client application to a server application provides advantages over other recovery methods since the recovered Dirty Series table is distinct from the 'live' Dirty Series table and, once the recovery is complete, the recovered Dirty Series table can be deleted without any impact to the active table. No new columns, such as state, need be added to the Dirty Series table, history is preserved in the patch area, ingress of new images is not delayed, nor does it contend with the ongoing image restoration. Multiple instances of the method for searching for entries in the recovery tables that match entries in the DICOMDB database can also be run simultaneously to speed up the restoration of the DICOMDB database.

It will be understood that the example applications described herein are illustrative and should not be considered limiting. It will be appreciated that the actions described and shown in the example flowcharts may be carried out or performed in any suitable order. It will also be appreciated that not all of the actions described in FIG. 2 need to be performed in accordance with the example embodiments of the disclosure and/or additional actions may be performed in accordance with other example embodiments of the disclosure.

Many modifications and other example embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for backing up and restoring one or more updates to metadata of one or more files containing content stored in a database, comprising:
   receiving the one or more updates to the metadata of the one or more files, wherein the metadata is to be included in the one or more files;

entering the one or more updates to the metadata of the one or more files into a first database table of the database, wherein the first database table comprises dirty data, the dirty data indicating that the one or more updates to the metadata has not yet been included in the one or more files;

generating at least one backup file of the first database table in computer-readable storage that is communicatively connected with the database; and restoring the one or more updates to the metadata by:
creating a recovery table within the database, wherein the recovery table is populated with data from the at least one backup file;
determining which of the one or more files to apply the one or more updates to by searching one or more entries in the recovery table for an identifier of the one or more files; and
adding the one or more updates to the metadata from the recovery table to the corresponding one or more files that matches the identifier identified from the recovery table such that the one or more updates to the metadata are included with the content in the one or more files.

2. The method of claim 1, wherein the generating the at least one backup file of the first database table includes generating a pair of backup files corresponding to the first database table.

3. The method of claim 2, wherein a first backup file of the pair of backup files includes a timestamp of when the one or more updates to the metadata were entered and an identifier of a source of the one or more updates;
wherein the first backup file further includes an identifier of the one or more files affected by the one or more metadata updates; and
wherein a second backup file of the pair of backup files includes an identifier of a metadata item that was updated and a new value for the metadata item.

4. The method of claim 3, wherein the first and the second backup file have a one-to-many relationship.

5. The method of claim 2, wherein the creating the recovery table populated with data from the backup file includes creating a pair of recovery tables populated with data from each of the pair of backup files, respectively.

6. The method of claim 1, wherein the dirty data are characterized by not having been committed to a common storage location.

7. The method of claim 1, wherein the generating the backup file of the first database table is performed at a predefined date and time.

8. The method of claim 1, wherein the one or more files are DICOM files, and the method comprises adding the metadata to a patch area of each of the one or more files matching the identifier of the one or more entries from the recovery table.

9. The method of claim 1, wherein the one or more files have a leveled hierarchy, wherein each level of the one or more files includes data objects, wherein the updates to the metadata of the one or more files are to be included in each of the data objects.

10. A method for backing up and restoring metadata of one or more files containing content stored in a database, comprising:
receiving metadata associated with the one or more files and entering the received metadata into a first database table of the database, wherein the first database table comprises dirty data, the dirty data indicating that the metadata has not yet been included in the one or more files;
generating a backup file that corresponds to the first database table in computer-readable storage that is communicatively connected with the database;
retrieving the metadata by creating a recovery table within the database populated with data from a backup file; and
incorporating the metadata to the corresponding one or more files by:
searching for one or more entries in the recovery table matching an identifier of the one or more files; and
adding the metadata to a patch area of each of the one or more files matching the identifier of the one or more entries from the recovery table such that the metadata is included with the content in the one or more files.

11. The method of claim 10, wherein the entering the metadata of the one or more files to the first database table includes entering one or more updates to the metadata in at least one of a patient, study, and series level of the one or more files.

12. The method of claim 11, further comprising restoring the one or more files to the database by searching for entries in the recovery table that match a series identifier of the one or more files to be restored.

13. The method of claim 10, wherein the generating the file that corresponds to the first database table includes generating a backup file of the first database table.

14. The method of claim 10, wherein the generating the file that corresponds to the first database table includes generates a first file including details about the metadata that was entered to the first database table.

15. The method of claim 10, wherein the generating the file that corresponds to the first database table includes generating a second file including an identifier of the metadata that was entered into the first database table.

16. The method of claim 15, wherein the second file further includes a new value for the metadata corresponding to the identifier in the first database table.

17. A non-transitory computer readable storage medium containing instructions for backing up and restoring metadata of one or more files containing content stored in a database, the instructions comprising:
receiving the one or more updates to the metadata of the one or more files, wherein the metadata is to be included in the one or more files;
entering one or more updates to the metadata of the one or more files into a first database table of the database, wherein the first database table comprises dirty data, the dirty data indicating that the one or more updates to the metadata has not yet been included in the one or more files;
generating a backup file of the first database table in computer-readable storage that is communicatively connected with the database; and
restoring the one or more updates to the metadata by:
creating a recovery table within the database, wherein the recovery table is populated with data from the backup file;
determining which of the one or more files to apply the one or more updates to the metadata by searching for one or more entries in the recovery table having an identifier that matches the one or more files; and
adding the one or more updates to the metadata from the recovery table to the one or more files that matches the identifier determined from the recovery table such that the one or more updates to the metadata are included with the content in the one or more files.

18. The computer readable storage medium of claim 17, wherein the generating the backup file of the first database table includes generating a first backup file that contains an identifier of a source from which the one or more updates to the metadata was received; and wherein the first backup file further contains an identifier of a series affected by the one or more metadata updates.

19. The computer readable storage medium of claim 18, wherein adding the one or more updates to the metadata from the recovery table to the one or more files comprises adding the one or more updates to a patch area of the one or more files.

20. The computer readable storage medium of claim 17, wherein the generating the backup file of the first database table includes generating a second backup file that contains an identifier of a metadata item that was changed and a new value for the metadata item.

\* \* \* \* \*